US006839170B2

(12) United States Patent
Li

(10) Patent No.: US 6,839,170 B2
(45) Date of Patent: Jan. 4, 2005

(54) OPTICAL ISOLATOR

(75) Inventor: Wei-Zhong Li, San Jose, CA (US)

(73) Assignee: Oplink Communications, Inc., San Jose, CA (US)

(*) Notice: Subject to any disclaimer, the term of this patent is extended or adjusted under 35 U.S.C. 154(b) by 0 days.

(21) Appl. No.: 10/272,534

(22) Filed: Oct. 15, 2002

(65) Prior Publication Data

US 2004/0070827 A1 Apr. 15, 2004

(51) Int. Cl.⁷ .............................................. G02B 27/28
(52) U.S. Cl. ...................... 359/484; 359/497; 359/499; 359/900; 372/703
(58) Field of Search .................... 372/703; 359/484, 359/499, 900, 494, 496, 497

(56) References Cited

U.S. PATENT DOCUMENTS

| | | | | |
|---|---|---|---|---|
| 4,548,478 A | | 10/1985 | Shirasaki | 359/256 |
| 5,402,509 A | | 3/1995 | Fukushima | 385/33 |
| 5,408,354 A | | 4/1995 | Hosokawa | 359/281 |
| 5,493,440 A | * | 2/1996 | Souda et al. | 359/341.1 |
| 5,499,132 A | | 3/1996 | Tojo et al. | 359/281 |
| 5,566,259 A | * | 10/1996 | Pan et al. | 385/11 |
| 5,606,439 A | | 2/1997 | Wu | 349/117 |
| 5,631,771 A | * | 5/1997 | Swan | 359/484 |
| 5,727,109 A | * | 3/1998 | Pan et al. | 385/140 |
| 5,930,039 A | | 7/1999 | Li et al. | 359/484 |
| 6,052,228 A | | 4/2000 | Xie et al. | 359/496 |
| 6,055,104 A | * | 4/2000 | Cheng | 359/495 |
| 6,061,167 A | | 5/2000 | Song | 359/256 |
| 6,181,846 B1 | * | 1/2001 | Pan | 385/18 |
| 6,195,479 B1 | * | 2/2001 | Pan | 385/18 |
| 6,212,313 B1 | | 4/2001 | Li | 385/24 |
| 6,246,518 B1 | * | 6/2001 | Chang et al. | 359/494 |
| 6,282,025 B1 | | 8/2001 | Huang et al. | 359/495 |
| 6,310,989 B1 | | 10/2001 | Liu | 385/11 |
| 6,331,913 B1 | | 12/2001 | Huang et al. | 359/497 |
| 6,339,661 B1 | | 1/2002 | Kokkelink et al. | 385/11 |
| 6,404,538 B1 | * | 6/2002 | Chen et al. | 359/323 |
| 6,466,704 B1 | * | 10/2002 | Frisken | 385/11 |
| 6,480,331 B1 | * | 11/2002 | Cao | 359/484 |
| 6,507,422 B1 | * | 1/2003 | Fukushima | 398/79 |
| 6,628,455 B1 | | 9/2003 | Lee | 359/341.32 |
| 6,628,461 B2 | | 9/2003 | Huang et al. | 359/494 |
| 2001/0053022 A1 | | 12/2001 | Tai et al. | 359/484 |
| 2002/0008901 A1 | | 1/2002 | Kinoshita | 359/341.1 |
| 2002/0060843 A1 | | 5/2002 | Huang et al. | 359/484 |
| 2002/0071182 A1 | * | 6/2002 | Huang et al. | 359/484 |
| 2002/0191289 A1 | | 12/2002 | Chuang | 359/495 |
| 2003/0053209 A1 | * | 3/2003 | Chang et al. | 359/484 |

FOREIGN PATENT DOCUMENTS

| | | | |
|---|---|---|---|
| EP | 0 492 850 A2 | * | 7/1992 |
| JP | 04-221922 A | * | 8/1992 |
| JP | 08-171075 A | * | 7/1996 |

* cited by examiner

Primary Examiner—John Juba, Jr.
(74) Attorney, Agent, or Firm—Fish & Richardson P.C.

(57) ABSTRACT

An optical system provides reflection-type isolation, and may include variable optical attenuation and/or a tap monitor. The optical system may include an optical isolator with a beam splitter such as a walk-off plate, a focusing element such as a GRIN lens, a combiner comprising two birefringent wedges and a non-reciprocal rotating device such as a Faraday rotator, a compensation device, and a reflector. The Faraday rotator may be variable to provide variable attenuation. The reflector may be a partial reflector to provide a tap monitor. The optical system is configured so that light transmitted into the optical isolator through the input fiber may be transmitted out of the optical isolator through the output fiber, but light transmitted into the optical isolator through the output fiber is generally not transmitted out of the optical isolator through the input fiber.

64 Claims, 3 Drawing Sheets

OPTICAL ISOLATOR

TECHNICAL FIELD

This invention relates to optical technology.

BACKGROUND

Optical isolators, variable optical attenuators, and tap monitors are used in optical communication systems and optical measurement systems. An optical isolator allows a beam of light to pass through a device in a chosen direction, but generally prevents light from passing through the device in the opposite direction. A variable optical attenuator adjusts the power ratio between a light beam exiting the device and a light beam entering the device over a variable range. A tap monitor is used to measure the power of a light beam entering or exiting a device, or for measuring other properties of light in a device.

Although optical components are available to provide isolation, variable attenuation, and tap monitoring, it is desirable to provide an improved optical system capable of providing isolation in which the attenuation may also be varied, and/or which may also include a tap monitor for sampling light in the system.

SUMMARY

According to an embodiment of the invention, an optical system includes an optical isolator with a beam splitter, a focusing element, a combiner comprising two birefringent wedges and a non-reciprocal rotating device, a compensation device, and a reflector. Light may be transmitted into the optical isolator through an input fiber, and out of the optical isolator through an output fiber.

According to an embodiment of the invention, an optical system provides reflection-type isolation. In other embodiments, variable optical attenuation may be provided and/or a tap monitor may be provided.

Light transmitted into the optical system via an input fiber is split into two beams by the beam splitter, according to the polarization state of the input light. A first beam comprises light of a first polarization state, while a second beam comprises light of a second polarization state.

In an embodiment of the invention, the beam splitter is a walk-off plate made of a birefringent material. When the first polarization state is an e-ray in the birefringent material, the first beam is deflected in the birefringent material. The second beam, an o-ray, is not deflected.

The first and second beams are transmitted through a focusing element, and are focused toward a focusing axis. In an embodiment, the focusing element is a lens such as a gradient index (GRIN) lens.

The first and second beams are then transmitted to a combiner, which comprises a first birefringent wedge with a first optical axis, a non-reciprocal rotating device, and a second birefringent wedge with a second optical axis. In some embodiments, the non-reciprocal rotating device is a Faraday rotator. As the first and second beams are transmitted through the combiner, their polarization states are rotated, and they are refracted by surfaces of the birefringent wedges.

The first and second beams are then transmitted through the compensation device, which is configured to alter the phase difference between the first and second beams. According to one embodiment, the compensation device is constructed from a birefringent material with a fast and a slow axis, such that the first beam travels through the compensation device at a higher speed than the second beam. Half of the phase difference between the first and second beams that resulted from the first beam traveling a longer path through the walk off plate is compensated during the transmission in the forward direction.

The first and second beams are reflected by the reflector. In some embodiments, substantially all of the first and second beams is reflected. In other embodiments, a partial reflector is used such that a portion of the first and second beams is reflected, while a portion of the first and second beams is transmitted through the partial reflector.

The portion of the first and second beams that is reflected is transmitted through the compensation device in the reverse direction. The remaining half of the phase difference between the first and second beams is compensated for during this transmission, such that the phase relationship between the first and second beams is about the same as the initial phase difference between the beams.

The first and second beams are transmitted in the reverse direction through the combiner, and the walk-off plate, such that substantially all of the reflected portion of the first and second beams is transmitted out of the optical isolator through the output fiber.

Light transmitted into the optical isolator through the output fiber is substantially absorbed within the optical isolator rather than transmitted out of the optical isolator through the input fiber. In some embodiments, a portion of the light transmitted into the optical isolator through the output fiber may be transmitted through a partial reflector, while the remaining light transmitted into the optical isolator through the output fiber is absorbed by the optical isolator.

In some embodiments, the attenuation of light transmitted into the optical isolator from the input fiber can be varied. For example, the non-reciprocal rotating device may be a variable non-reciprocal rotating device. The attenuation of the optical isolator may be varied by varying the angle of rotation. In some embodiments, a variable non-reciprocal rotating device comprises a Faraday rotator and a magnet that may be varied. For example, an electromagnet whose current may be varied may be used to vary the rotation angle. A portion of the light is then absorbed by the optical isolator rather than transmitted out of the optical isolator via the output fiber.

The input fiber and output fiber are configured so that light from the input fiber may be transmitted out through the output fiber, but light from the output fiber is not transmitted through the input fiber. A support structure may be used to support and/or align the input fiber and output fiber.

The characteristics of the walk-off plate, including its thickness and relative indices of refraction, may be varied to obtain optical isolation. The polarization rotation angle may be varied, as may the angle of one or both of the birefringent wedges. The thickness of the compensation device and its relative indices of refraction may be varied. Thicknesses, constituent materials, separations, and angles of the components of the optical isolator may be varied such that light transmitted into the optical isolator via the input fiber may be transmitted out through the output fiber, while light transmitted into the optical isolator through the output fiber is generally not transmitted out of the optical isolator via the input fiber.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

According to an embodiment of the invention, an optical system provides reflection-type isolation. In other embodiments, variable optical attenuation and/or a tap monitor may be provided.

Figure 1:
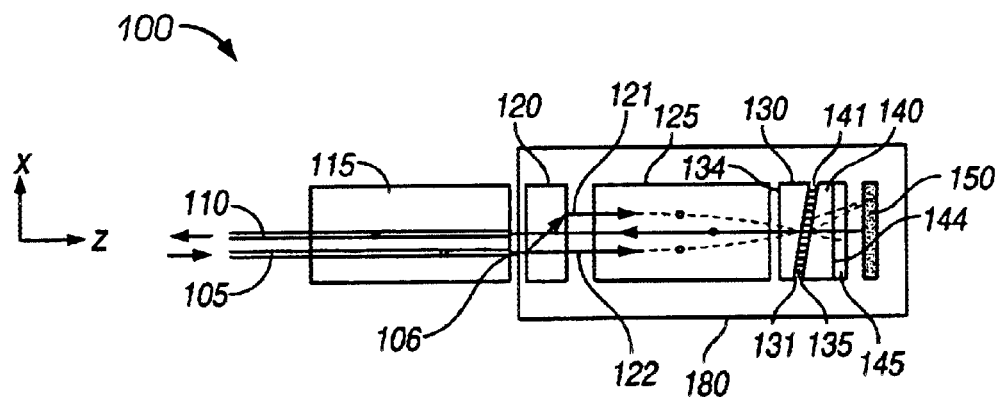
FIG. 1 is a top view of an optical system.
Figure 2:
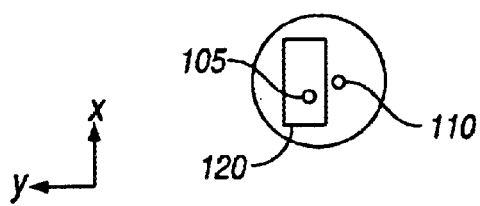
FIG. 2 is a cross-sectional view of the placement of an input fiber and an output fiber in a glass capillary.

FIG. 1 shows a top view of an optical system 100 according to an embodiment of the invention. An input fiber 105 and an output fiber 110 are disposed in a glass capillary 115. Glass capillary 115 provides structural support for the fibers and aligns them with the other components of system 100. FIG. 2 shows a cross section of glass capillary 115 and the spatial relationship between input fiber 105 and output fiber 110, as well as the position of a walk-off plate 120.

Input fiber 105 is configured to transmit light into an optical isolator 180. Input fiber 105 transmits the light to walk-off plate 120. Walk-off plate 120 comprises an anisotropic birefringent crystal. As FIG. 2 shows, light traveling through optical isolator 180 to or from input fiber 105 is transmitted through walk-off plate 120, while light traveling through optical isolator 180 to or from output fiber 110 is not transmitted through walk-off plate 120. Light transmitted to walk-off plate 120 can be classified as including an extraordinary ray (e-ray) of a first polarization and an ordinary ran (o-ray) whose polarization is orthogonal to that of the e-ray. The o-ray is not deflected by the walk-off plate, while the e-ray is deflected at an angle.

Optical isolator 180 includes an input port 106 and an output port 111, where input port 106 is configured to transmit light into optical isolator 180, and output port 111 is configured to transmit light out of optical isolator 180. In some embodiments, optical isolator 180 includes a support structure such as glass capillary 115, and input port 106 and output port 111 are provided in the support structure. Input port 106 may be configured to receive an input fiber such as fiber 105 and output port 111 may be configured to receive an output fiber such as fiber 110. Input port 106 and output port 111 are positioned so that at least a portion of the light transmitted into optical isolator 180 via input port 106 is transmitted out of optical isolator 180 via output port 111, while substantially none of the light transmitted into optical isolator 180 via output port 111 is transmitted out of optical isolator 180 via input port 106.

Figure 3:
FIG. 3 is a cross-sectional view indicating the polarization state of two branches of the input beam and of the output beam at one surface of a walk-off plate.

Referring again to FIG. 1, walk-off plate 120 splits the incoming light into two separate beams, where the polarization state of a first beam 121 is an e-ray, while the polarization state of a second beam 122 is an o-ray. FIG. 3 shows the polarization states of first beam 121 and second beam 122 as the beams exit walk-off plate 115.

Referring again to FIG. 1, first beam 121 and second beam 122 are transmitted from walk-off plate 120 to a lens 125 such as a gradient index (GRIN) lens. As FIG. 1 shows, lens 125 focuses first beam 121 and second beam 122 towards the centerline of the xz plane. First beam 121 and second beam 122 are then transmitted through a combination device comprising a first wedge 130, a Faraday rotator 135, a second wedge 140, and a polarization mode dispersion (PMD) compensation plate 145.

Figure 4A:
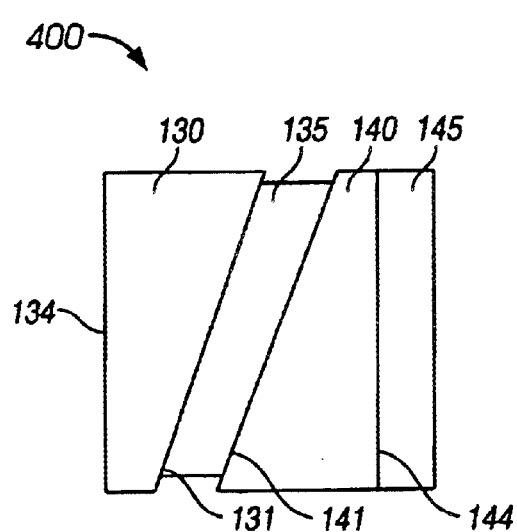
FIG. 4a is top view of a combiner.

FIG. 4a shows a combination device 400 comprising first wedge 130, second wedge 140, Faraday rotator 135, and PMD compensation plate 145. First wedge 130 and second wedge 140 are in the form of tapered wedges and are constructed from a birefringent material. First wedge 130 has a first surface 131 and a second surface 134. Second wedge 140 has a first surface 141 and a second surface 134, where first surface 131 of first wedge 130 faces first surface 141 of second wedge 140. According to one embodiment, first surface 131 of first wedge 130 substantially parallels first surface 141 of second wedge 140.

Figure 4B:
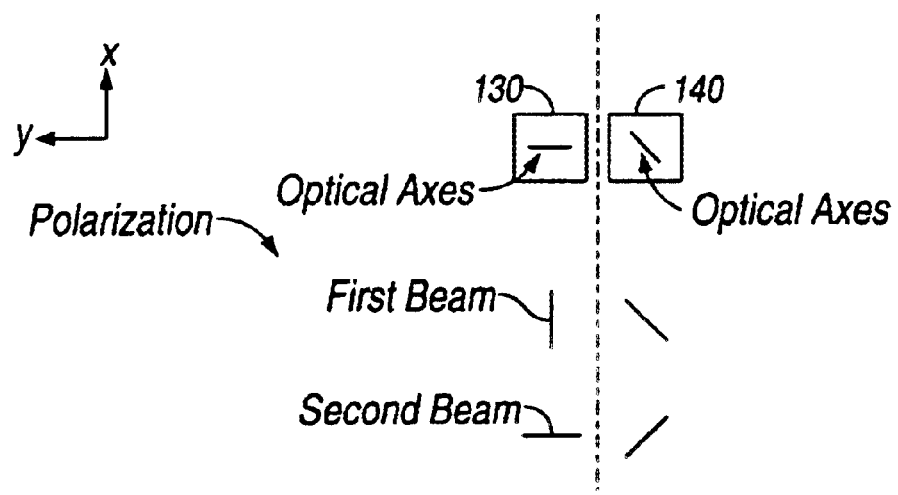
FIG. 4b shows the optical axes of a first and second wedge, as well as the polarization states of two branches of the input beam as they are transmitted through the first wedge and the second wedge.

FIG. 4b illustrates the effect on the polarization of light passing through first wedge 130, Faraday rotator 135, and second wedge 140. The effect of optical elements such as these on e-rays and o-rays is described in detail in pending U.S. Patent Application entitled "Depolarizer," Wei-Zhong Li, Qingdong Guo, Ser. No. 10/119,570, filed on Apr. 9, 2002, which is hereby incorporated by reference in its entirety.

As shown in FIG. 4b, the optical axis of first wedge 130 is in the y-direction, while the optical axis of second wedge 140 is in the x–y direction. Faraday rotator 135 is designed so that the polarization of light passing through Faraday rotator 135 in either the positive or negative z-direction will be rotated 45 degrees with respect to the positive z axis.

According to an embodiment of the invention, Faraday rotator 135 is constructed from a magnetic garnet single crystal material, for example, the Faraday rotators provided by Mitsubishi Gas Chemicals may be used. Other materials may be used for Faraday rotator 135. According to other embodiments, non-reciprocal polarization rotators other than Faraday rotators may be used.

First beam 121 enters first wedge 130 with x polarization, as an o-ray. At first surface 131 of first wedge 130, first beam 121 is refracted. As first beam 121 traverses Faraday rotator 135, its polarization is rotated 45 degrees with respect to the +z axis and as a result it is in the x+y polarization state, and is an e-ray in second wedge 140. First beam 121 is refracted by first surface 141 of second wedge 140, so that it exits second wedge 140 traveling in the forward z direction.

Second beam 122 enters first wedge 130 with y polarization, as an e-ray. At first surface 131 of first wedge 130, second beam 122 is refracted. As second beam 122 traverses Faraday rotator 135, its polarization is rotated 45 degrees with respect to the +z axis, and as a result it exits Faraday rotator 135 in the x–y polarization state. Second beam 122 is an o-ray in second wedge 140. Second beam 122 is refracted by first surface 141 of second wedge 140, so that it exits second wedge 140 traveling in the forward z direction.

After exiting second wedge 140, the first and second beams (which have combined into a single beam in physical space but will still be discussed separately in order to talk about their respective phase states and polarization states) are transmitted through PMD compensation plate 145. According to an embodiment of the invention, the optical axis of PMD compensation plate is in the x+y direction. First beam 121 and second beam 122 are both traveling along the +z axis, and have orthogonal polarization states. However, since first beam 121 traveled a greater distance through walk-off plate 120, the phase of first beam 121 is shifted with respect to the phase of second beam 122. PMD compensation plate 145 is configured to compensate for this phase shift as light travels through it first in the +z direction and then in the −z direction.

PMD compensation plate 145 is constructed from a birefringent material with its "slow" axis in the x–y direction and its "fast" axis in the x+y direction. Therefore, the polarization state of first beam 121 is along the fast axis of the PMD compensation plate 145, while the polarization state of second beam 122 is along the slow axis of PMD compensation plate 145. The thickness of PMD compensation plate 145 is chosen so that, given its refraction indices in the fast and slow directions, second beam 122 is delayed with respect to first beam 121 sufficiently to compensate for half of the phase difference between the beams as they traverse through PMD compensation plate 145 in the forward +z direction.

After traversing PMD compensation plate 145 in the forward direction, the combined beams are reflected by reflector 150. The combined beams then traverse PMD compensation plate 145 in the reverse direction, during which the remaining phase shift is compensated for. Upon exiting compensation plate 145 in the reverse direction, the first and second beams have regained their initial phase relationship. First beam 121 is polarized in the x+y direction, while second beam 122 is polarized in the x−y direction.

Next, the combined beams traverse second wedge 140, Faraday rotator 135, and first wedge 130 in the reverse direction. First beam 121 is refracted by first surface 141 of second wedge 140. First beam 121 is an e-ray in second wedge 140. First beam 121 enters Faraday rotator 135, where its polarization is rotated by 45 degrees with respect to the +z axis. First beam 121 is an e-ray in first wedge 130. It is refracted by first surface 131 of first wedge 130, exiting first wedge 130 in the −z direction with polarization in the y direction.

Second beam 122 enters second wedge 140 and is refracted by first surface 141 of second wedge 140. Second beam 122 is an o-ray in second wedge 140. Second beam 122 enters Faraday rotator 135, where its polarization is rotated by 45 degrees with respect to the +z axis. Second beam 122 is an o-ray in first wedge 130. Second beam 122 is refracted by first surface 131 of first wedge 130, exiting first wedge 130 in the −z direction with polarization in the x direction.

First beam 121 and second beam 122, having regained their initial polarization states and phase relationship, travel through lens 125 in the −z direction. First beam 121 and second beam 122 then continue through output fiber 110.

FIG. 5a shows a side view of light traveling in the forward direction through optical system 100 corresponding to the top view shown in FIG. 1. Light is input to optical system 100 through input fiber 105. The light is refracted by a surface 116 of glass capillary 115. The light is then transmitted through walk-off plate 120, refracted by a surface 124 of lens 125, and transmitted through first wedge 130, Faraday rotator 135, second wedge 140, and PMD compensation plate 145.

Figure 5:
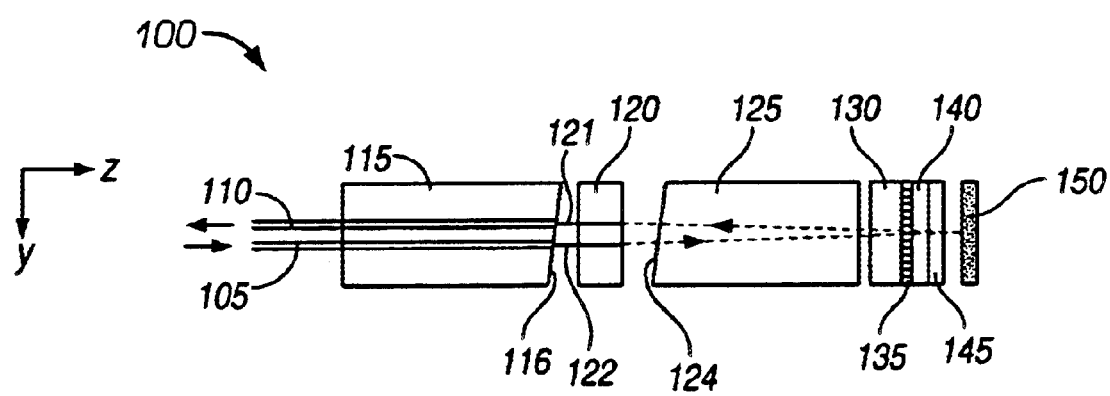
FIG. 5 is a top view of the optical system shown in FIG. 1.

The light is reflected by reflector 150, then traverses optical system 100 in the −z direction, where it is refracted first by surface 124 of lens 125 and then by surface 116 of glass capillary 115. As FIG. 5 shows, the components of optical system 100 are configured so that the total deflection in the y direction upon traversing the optical system 100 in the forward and reverse directions is equal to the separation in the y direction between input fiber 105 and output fiber 110.

Figure 6:
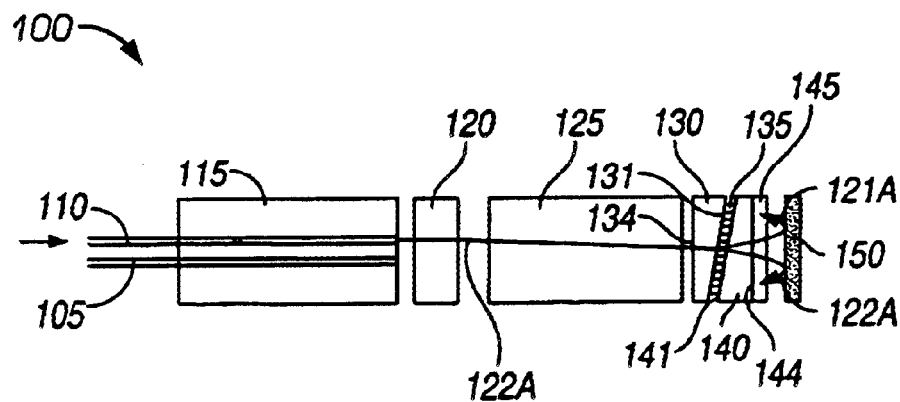
FIG. 6 is a side view of the optical system in FIG. 1, showing the optical path of light transmitted into the optical system through an output port.

FIG. 6 is a top view of optical system 100 showing the behavior of light that is input to optical system 100 through output fiber 110 rather than input fiber 105. FIG. 6 illustrates how optical system 100 acts as an optical isolator; that is, light passes through system 100 in one direction (e.g. in through input fiber 105 and out through output fiber 110) but does not pass through in the other direction (e.g. light cannot pass in through output fiber 110 and out through input fiber 105).

Light entering optical system 100 through output fiber 110 travels along the positive z axis through lens 125. In first wedge 130, the light has a component that is an e-ray and a component that is an o-ray. At second surface 131 of first wedge 130, the light is split into a first beam 121A and a second beam 122A. First beam 121A is deflected in the +x direction, while second beam 122A is deflected in the −x direction. Upon reflection from reflector 150, first beam 121A is further deflected in the +x direction, while second beam 122A is further deflected in the −x direction. Therefore, neither first beam 121A nor second beam 122A is transmitted out of optical system 100 through input port 105.

Figure 7:
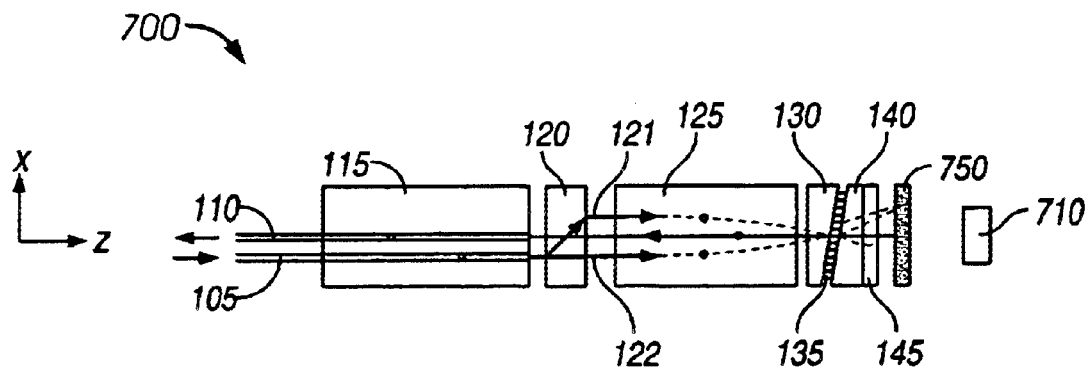
FIG. 7 is a side view of the optical system in FIG. 1, modified to perform tap monitoring.

According to some embodiments, an optical system includes an optical isolator and a tap monitor. FIG. 7 shows an optical system 700, which is similar to optical system 100 of FIG. 1 except that reflector 150 has been replaced by a partial reflector 750, and a photodetector 710 has been added. Optical system 700 provides optical isolation and a tap monitor. Photodetector 710 is positioned behind partial reflector 750. When the beams are incident on partial reflector 750, a portion of the light is reflected and a portion of the light is transmitted. Partial reflector 750 may be configured so that the transmitted power has a known relationship to the reflected power, so that by measuring the power of the transmitted light, the power of the reflected light can be determined. For example, the power of the transmitted light may be proportional to the power of the reflected light.

Figure 8:
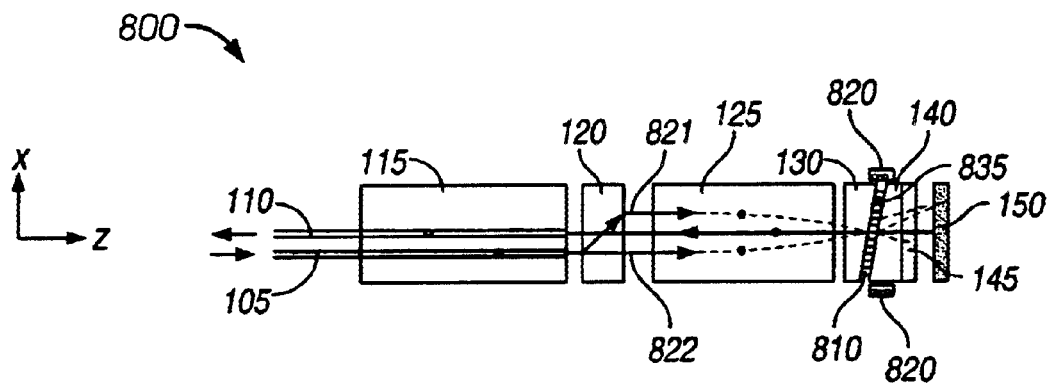
FIG. 8 is a side view of the optical system in FIG. 1, modified for variable attenuation.

According to some embodiments, an optical system includes an optical isolator and variable attenuator. FIG. 8 shows an optical system 800, which is similar to optical system 100 of FIG. 1 except that Faraday rotator 135 has been replaced with a variable rotator system 810. Variable rotator system 810 is configured so that the polarization of light passing through variable rotator system 810, either in the positive or negative z direction, is rotated by a variable angle ϕ that can be controlled by external parameters (e.g., by controlling the electric current to variable rotator system 810).

System 810 includes a Faraday rotator 835. In other embodiments, other non-reciprocal polarization rotators may be used. System 810 includes an electromagnetic ring 820. The variable angle φ may be altered by changing the strength of the magnetic field generated by electromagnetic ring 820.

In the embodiment illustrated in FIG. 8, the maximum output signal is obtained when p is 45 degrees. In that case, substantially all of first beam 821 and second beam 822 are transmitted out of optical system 800 on output fiber 110.

For φ different from 45 degrees, substantially only the component of first beam 821 in the x+y direction after first beam 821 is transmitted through Faraday rotator 835 in the +z direction is transmitted out of optical system 800 on output fiber 110. Similarly, substantially only the component of second beam 822 in the x−y direction after second beam 822 is transmitted through Faraday rotator 835 in the +z direction is transmitted out of optical system 800 on output fiber 110. Thus, providing variable rotator system 810 in optical system 800, the attenuation may be varied.

Figure 9:
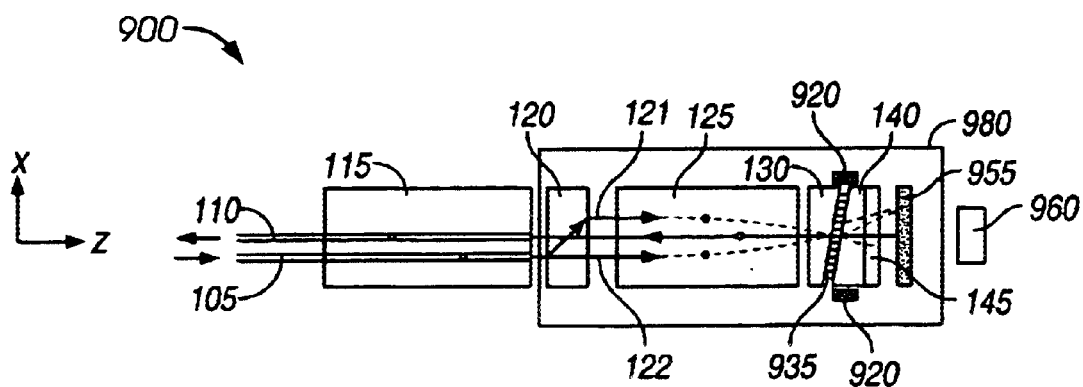
FIG. 9 is a side view of the optical system in FIG. 1, modified for both variable attenuation and tap monitoring.

According to some embodiments, an optical isolator with variable attenuation and tap monitoring is provided. FIG. 9 shows a side view of an optical system 900 including an optical isolator 980. Optical isolator 980 includes a variable non-reciprocal rotation device such as Faraday rotator 935. Faraday rotator 935 acts as a variable non-reciprocal rotation device by providing a variable magnetic field; for example, by providing an electromagnet 920, whose current may be varied. Additionally, optical system 900 includes a partial reflector 955 and photodetector 960. At least a portion of light transmitted in a forward direction through optical isolator 980 is transmitted through partial reflector 955 and may be detected using photodetector 960. Properties of the light transmitted through partial reflector 955, such as the beam power, polarization state, and/or phase, may be determined.

A number of embodiments of the invention have been described. Nevertheless, it will be understood that various modifications may be made without departing from the spirit and scope of the invention. For example, a structure different from a glass capillary may be used to support and/or align the input and output fibers.

Additionally, different materials and thicknesses may be used, depending on their optical properties. For example, by altering the birefringent material used for walk-off plate 120 of FIG. 1, the deflection of the first beam may be varied. The wedge/Faraday rotator/wedge system may use different angles as well. Other polarization rotation methods may be used rather than the Faraday rotator described herein for embodiments of the invention. The separation of optical elements may be altered. The separation of the input and output fibers may be varied. One of ordinary skill in the optical art recognizes that variations of the types of optical devices and systems, their optical properties, and their spatial relationships may be used. Accordingly, other embodiments are within the scope of the following claims.

What is claimed is:

1. An optical isolator, comprising:
    a beam splitter configured to receive light comprising light of a first polarization and light of a second polarization with a first phase difference, said beam splitter further configured to deflect said light of a first polarization as a first beam and to transmit said light of a second polarization as a second beam;
    a focusing element having a focusing axis, configured to receive said first beam and said second beam and to focus said first beam and said second beam toward said focusing axis;
    a first birefringent wedge having a first optical axis, configured to receive said first beam and said second beam;
    a non-reciprocal rotating device configured to receive said first beam and said second beam and to rotate said first polarization state and said second polarization state;
    a second birefringent wedge having a second optical axis, configured to receive said first beam and said second beam;
    a compensation device, configured to transmit said first beam at a first speed and said second beam at a second speed, such that a phase difference between said first beam and said second beam is equal to said first phase when said first beam and said second beam exit said compensation element; and
    a reflector, configured to reflect at least a portion of said first beam and said second beam.

2. The optical isolator of claim 1, wherein said beam splitter comprises a birefringent material.

3. The optical isolator of claim 2, wherein said birefringent material comprises a walk-off plate.

4. The optical isolator of claim 1, wherein said focusing element comprises a lens.

5. The optical isolator of claim 4, wherein said lens comprises a gradient index lens.

6. The optical isolator of claim 1, wherein said compensation element comprises a birefringent material.

7. The optical isolator of claim 1, wherein said compensation element comprises a polarization mode dispersion plate.

8. The optical isolator of claim 1, wherein said reflector reflects substantially all of said first beam and said second beam.

9. The optical isolator of claim 1, wherein said reflector reflects only a part of said first beam and said second beam.

10. The optical isolator of claim 1, further comprising an input port for transmitting light to said optical isolator.

11. The optical isolator of claim 10, further comprising an output port for transmitting light from said optical isolator.

12. The optical isolator of claim 11, wherein said input port and said output port are aligned such that when light is transmitted into said optical isolator through said input port, at least a portion of said light is transmitted out of said optical isolator through said output port.

13. The optical isolator of claim 11, wherein said input port and said output port are aligned such that when light is transmitted into said optical isolator through said input port and reflected off said reflector, substantially all of said light reflected off said reflector is transmitted out of said optical isolator through said output port.

14. The optical isolator of claim 11, wherein said input port and said output port are aligned such that when light is transmitted into said optical isolator through said output port, substantially none of said light is transmitted out of said optical isolator through said input port.

15. The optical isolator of claim 11, further comprising a support structure, wherein said support structure includes said input port and said output port.

16. The optical isolator of claim 15, wherein said support structure comprises a glass capillary.

17. The optical isolator of claim 1, wherein said non-reciprocal rotating device is a Faraday rotator.

18. The optical isolator of claim 17, wherein said Faraday rotator is configured to rotate a polarization direction of light of an initial polarization state by 45 degrees.

19. The optical isolator of claim 1, wherein said non-reciprocal rotating device is a variable rotating device.

20. The optical isolator of claim 19, wherein said variable rotating device comprises a Faraday rotator and a magnet.

21. The optical isolator of claim 20, wherein said magnet is an electromagnet.

22. The optical isolator of claim 21, wherein said variable rotating device is configured to rotate a polarization direction of light of an initial polarization state by an angle.

23. The optical isolator of claim 22, wherein said angle is varied by changing a current provided to said electromagnet.

24. A method of optical isolation, comprising:
   receiving light at an input port;
   splitting light into a first beam having a first polarization state and a second polarization state, said first beam and said second beam having a first phase difference;
   focusing said first beam and said second beam toward a focus axis;
   rotating the polarization of said first beam and said second beam by a rotation angle;
   transmitting said first beam and said second beam in a forward direction;
   reducing the first phase difference between the first beam and the second beam including varying a speed traveled by said first and second beams in the forward direction, wherein said first beam travels at a first speed and said second beam travels at a second speed different from the first speed;
   reflecting at least a portion of said first beam and said second beam;
   transmitting said first beam and said second beam in a reverse direction further reducing the first phase difference including varying a speed traveled by said first and second beams in the reverse direction, wherein the first beam travels at a first speed and the second beam travels at a second speed different from the first speed;
   rotating the polarization of said first beam and said second beam by said rotation angle; and
   transmitting said first beam and said second beam out an output port.

25. The method of claim 24, wherein said rotation angle is 45 degrees.

26. The method of claim 24, further comprising varying said rotation angle.

27. The method of claim 26, wherein said varying comprises increasing a current provided to an electromagnet.

28. The method of claim 24, wherein said rotating includes rotating using a Faraday rotator.

29. The method of claim 24, wherein reflecting at least a portion of the first beam and the second beam includes transmitting only a portion of the first beam and the second beam.

30. The method of claim 29, further comprising monitoring a property of said transmitted beam.

31. The method of claim 30, wherein said monitoring further comprises detecting said at least a portion of said transmitted beam.

32. The method of claim 30, wherein said property is a power.

33. The method of claim 24, wherein transmitting the first beam and the second beam in said reverse direction includes compensating for the first phase difference generated by a beam splitter.

34. The method of claim 24, further comprising transmitting light into said output port.

35. The method of claim 34, further comprising:
   isolating the light transmitted into the output port such that substantially all of the light is not transmitted to the input port.

36. The method of claim 24, further comprising:
   transmitting substantially all of the light transmitted into the input port out the output port.

37. The method of claim 24, further comprising:
   adjusting the light transmitted out of the output port such that an attenuated amount of the light transmitted into the input port is not transmitted from the output port.

38. The method of claim 37, further comprising varying said attenuated amount.

39. The method of claim 38, wherein said varying comprises changing said rotation angle.

40. An optical apparatus including dispersion compensation, comprising:
   a beam splitter;
   a focusing element optically coupled between the beam splitter and a first birefringent wedge;
   a second birefringent wedge;
   a non-reciprocal rotating device optically coupled between the first and the second birefringent wedges;
   a reflector; and
   a compensation device optically coupled between the second birefringent wedge and the reflector, the compensation device operable to minimize polarization mode dispersion.

41. The optical isolator of claim 40, wherein the beam splitter comprises a birefringent material.

42. The optical isolator of claim 41, wherein the birefringent material comprises a walk-off plate.

43. The optical isolator of claim 40, wherein the focusing element comprises a lens.

44. The optical isolator of claim 43, wherein the lens comprises a gradient index lens.

45. The optical isolator of claim 40, wherein the compensation element comprises a birefringent material.

46. The optical isolator of claim 40, wherein the compensation element comprises a polarization mode dispersion plate.

47. The optical isolator of claim 40, wherein the reflector is substantially completely reflective.

48. The optical isolator of claim 40, wherein the reflector is partially reflective.

49. The optical isolator of claim 40, further comprising:
   an input port optically coupled to the beam splitter.

50. The optical isolator of claim 49, further comprising:
   an output port optically coupled to the beam splitter.

51. The optical isolator of claim 50, wherein the input port and the output port are aligned such that when light is transmitted into the optical isolator through the input port, at least a portion of the light is transmitted out of the optical isolator through the output port.

52. The optical isolator of claim 50, wherein the input port and the output port are aligned such that when light is transmitted into the optical isolator through the input port and reflected off the reflector, substantially all of said light reflected off the reflector is transmitted out of the optical isolator through the output port.

53. The optical isolator of claim 50, wherein the input port and the output port are aligned such that when light is transmitted into the optical isolator through the output port, substantially none of the light is transmitted out of the optical isolator through the input port.

54. The optical isolator of claim 50, further comprising:
a support structure, wherein the support structure includes the input port and the output port.

55. The optical isolator of claim 54, wherein the support structure comprises a glass capillary.

56. The optical isolator of claim 50, wherein the non-reciprocal rotating device is a Faraday rotator.

57. The optical isolator of claim 56, wherein the Faraday rotator is configured to rotate a polarization of light of an initial polarization state by substantially 45 degrees.

58. The optical isolator of claim 50, wherein the non-reciprocal rotating device is a variable rotating device.

59. The optical isolator of claim 58, wherein the variable rotating device comprises a Faraday rotator and a magnet.

60. The optical isolator of claim 59, wherein the magnet is an electromagnet.

61. The optical isolator of claim 60, wherein the variable rotating device is configured to rotate a polarization of light of an initial polarization state by an angle.

62. The optical isolator of claim 61, wherein the angle is varied by changing a current provided to the electromagnet.

63. A reflective variable attenuator, comprising:
a beam splitter;
a focusing element optically coupled between the beam splitter and a first birefringent wedge;
a second birefringent wedge;
a variable rotator device optically coupled between the first and the second birefringent wedges, the variable rotator device operable to rotate a polarization of light passing through the variable rotator by a variable angle; and
a reflector coupled to the second birefringent wedge.

64. The reflective variable attenuator of claim 63, wherein the variable rotator device includes a faraday rotator and an electromagnetic ring.

* * * * *